(12) United States Patent
Wojcik et al.

(10) Patent No.: US 10,923,983 B2
(45) Date of Patent: Feb. 16, 2021

(54) AIRCRAFT GENERATOR SYSTEMS AND HOUSINGS THEREOF

(71) Applicant: Hamilton Sundstrand Corporation, Charlotte, NC (US)

(72) Inventors: Craig J. Wojcik, Evansville, WI (US); Ted A. Martin, Winnebago, IL (US); Mark W. Metzler, Davis, IL (US); Richard L. Downing, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 381 days.

(21) Appl. No.: 16/048,873

(22) Filed: Jul. 30, 2018

(65) Prior Publication Data
US 2019/0363606 A1 Nov. 28, 2019

Related U.S. Application Data

(60) Provisional application No. 62/675,981, filed on May 24, 2018.

(51) Int. Cl.
| | |
|---|---|
| *H02K 5/20* | (2006.01) |
| *F02C 7/06* | (2006.01) |
| *H02K 7/18* | (2006.01) |
| *H02K 9/19* | (2006.01) |

(52) U.S. Cl.
CPC ............ *H02K 5/20* (2013.01); *F02C 7/06* (2013.01); *H02K 7/1823* (2013.01); *H02K 9/19* (2013.01); *F05D 2220/323* (2013.01); *F05D 2220/76* (2013.01); *F05D 2260/98* (2013.01)

(58) Field of Classification Search
CPC ... H02K 5/20; H02K 7/18; H02K 9/19; F02C 7/06; F05D 2220/323; F05D 2220/76; F05D 2260/98
See application file for complete search history.

(56) References Cited

U.S. PATENT DOCUMENTS

| | | | |
|---|---|---|---|
| 10,767,566 B2* | 9/2020 | Pal | ........................... H02K 9/04 |
| 2010/0264759 A1 | 10/2010 | Shafer et al. | |
| 2011/0084561 A1* | 4/2011 | Swales | ................. H02K 11/048 310/54 |

(Continued)

OTHER PUBLICATIONS

European Search Report for European Application No. 19176450.5, International Filing Date May 24, 2018, dated Oct. 19, 2019, 8 pages.

*Primary Examiner* — Naishadh N Desai
(74) *Attorney, Agent, or Firm* — Cantor Colburn LLP

(57) ABSTRACT

Generator housings for generators of aircraft are provided. The generator housings include a mounting pad at a first end, the generator housing extending to a second end, and a base arranged to connect to an electronics module. The generator housing defines a generator cavity and a flow path to supply a working fluid through the generator housing, the flow path extending between an inlet formed in the mounting pad and at least one outlet formed in the mounting pad. One or more electronics flow ports enable fluid connection between the flow path within the generator housing and the electronic module when connected and one or more inductor ports enable fluid connection between the flow path within the generator housing and one or more inductors when mounted to the generator housing.

20 Claims, 22 Drawing Sheets

(56) References Cited

U.S. PATENT DOCUMENTS

| | | | |
|---|---|---|---|
| 2012/0234520 A1* | 9/2012 | Pal | H05K 7/20918 |
| | | | 165/121 |
| 2012/0236498 A1* | 9/2012 | Pal | H05K 7/20909 |
| | | | 361/695 |
| 2013/0043747 A1 | 2/2013 | Kubes | |
| 2013/0241283 A1 | 9/2013 | Steinbauer et al. | |
| 2014/0292120 A1 | 10/2014 | Kalev | |

* cited by examiner

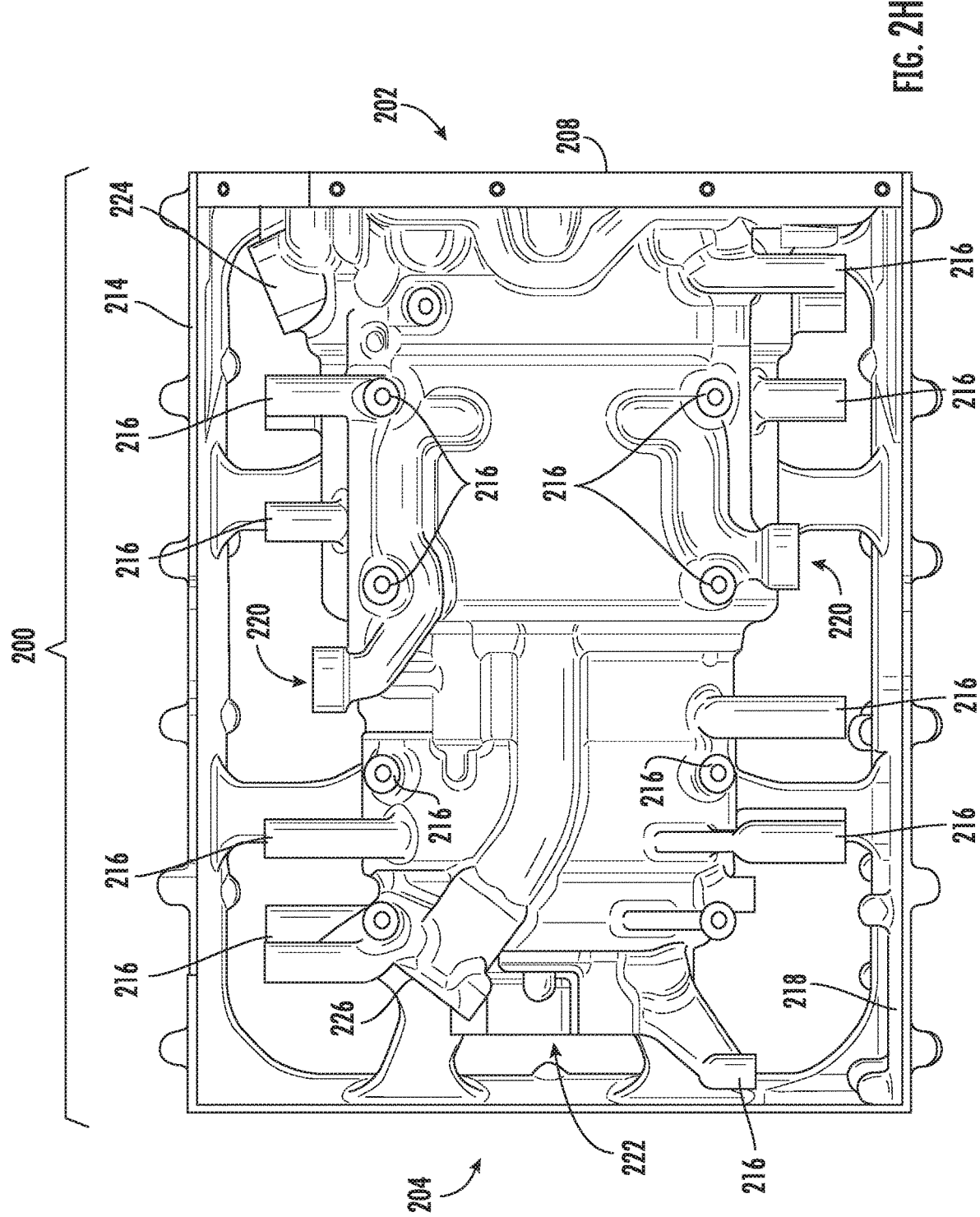

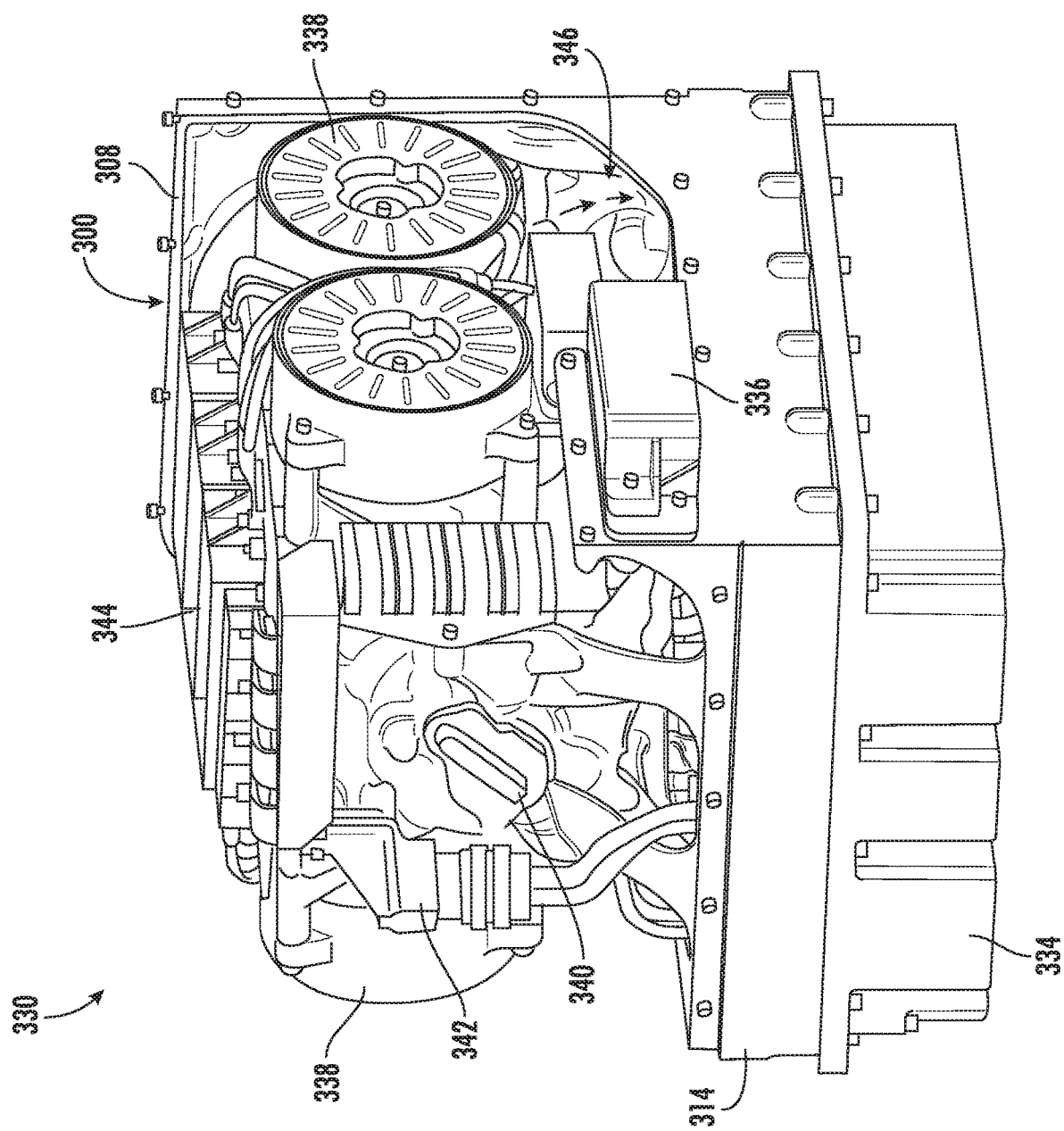

AIRCRAFT GENERATOR SYSTEMS AND HOUSINGS THEREOF

CROSS-REFERENCE TO RELATED APPLICATIONS

The present application claims priority from U.S. Provisional Patent Application No. 62/675,981, filed May 24, 2018. The contents of the priority application is hereby incorporated by reference in its entirety.

BACKGROUND

The subject matter disclosed herein generally relates to aircraft components, and more particularly to housing elements and structures for aircraft generators.

In aircraft, an engine is typically mounted in a housing attached to a wing of the aircraft. The housing is commonly referred to as a nacelle. The nacelle both supports and positions the engine with respect to the aircraft. An electrical generator, driven by the engine via a gearbox, is provided for supplying electric power to the aircraft. The generator may be located within the nacelle. The production of electric power is accompanied by the production of heat which must be removed to preserve the operating life of the generator. This heat may be removed by lubricating oil passing through the generator. Improvements to such cooling and lubricating systems may be desirable to provide minimal adverse effects upon the efficiency of the operating engine.

BRIEF DESCRIPTION

According to some embodiments, generator housings for generators of aircraft are provided. The generator housings include a mounting pad at a first end, the generator housing extending to a second end and a base arranged to connect to an electronics module. The generator housing defines a generator cavity and a flow path to supply a working fluid through the generator housing, the flow path extending between an inlet formed in the mounting pad and at least one outlet formed in the mounting pad. One or more electronics flow ports enable fluid connection between the flow path within the generator housing and the electronic module when connected and one or more inductor ports enable fluid connection between the flow path within the generator housing and one or more inductors when mounted to the generator housing.

In addition to one or more of the features described above, or as an alternative, further embodiments of the generator housings may include that the mounting pad is configured to mount to an engine of the aircraft.

According to some embodiments, generator assemblies of aircraft are provided. The generator assemblies include a generator housing defining a generator cavity and a generator installed within the generator cavity. The generator housing includes a mounting pad at a first end, the generator housing extending to a second end, and a base arranged to connect to an electronics module, wherein the generator housing defines a generator cavity and a flow path to supply a working fluid through the generator housing, the flow path extending between an inlet formed in the mounting pad and at least one outlet formed in the mounting pad, wherein one or more electronics flow ports enable fluid connection between the flow path within the generator housing and the electronic module when connected and one or more inductor ports enable fluid connection between the flow path within the generator housing and one or more inductors when mounted to the generator housing.

In addition to one or more of the features described above, or as an alternative, further embodiments of the generator assemblies may include that the mounting pad is configured to mount to an engine of the aircraft.

In addition to one or more of the features described above, or as an alternative, further embodiments of the generator assemblies may include an electronics module connected to the base of the generator housing and fluidly connected to the flow path within the generator housing.

In addition to one or more of the features described above, or as an alternative, further embodiments of the generator assemblies may include that a first electronics flow port directs the working fluid from the inlet of the generator housing into the electronics module and a second electronics flow port directs the working fluid from the electronics module into the generator housing.

In addition to one or more of the features described above, or as an alternative, further embodiments of the generator assemblies may include a pump installed within the generator housing, wherein the pump pumps a working fluid through at least a portion of the flow path within the generator housing.

In addition to one or more of the features described above, or as an alternative, further embodiments of the generator assemblies may include that the generator includes a shaft and the flow path is fluidly connected to the shaft to direct the working fluid through the shaft.

In addition to one or more of the features described above, or as an alternative, further embodiments of the generator assemblies may include that the shaft is arranged to direct the working fluid into the generator cavity.

In addition to one or more of the features described above, or as an alternative, further embodiments of the generator assemblies may include that the generator includes at least one stator and at least one rotor.

In addition to one or more of the features described above, or as an alternative, further embodiments of the generator assemblies may include that the working fluid is engine oil of a gas turbine engine.

In addition to one or more of the features described above, or as an alternative, further embodiments of the generator assemblies may include that the flow path directs the working fluid to cascade over the generator within the generator cavity.

According to some embodiments, aircraft are provided. The aircraft include an engine and a generator assembly mounted to the engine. The generator assembly includes a generator housing defining a generator cavity and a generator installed within the generator cavity, wherein the generator is operably connected to the engine. The generator housing includes a mounting pad at a first end for mounting to the engine, the generator housing extending to a second end, and a base arranged to connect to an electronics module, wherein the generator housing defines a generator cavity and a flow path to supply a working fluid through the generator housing, the flow path extending between an inlet formed in the mounting pad and at least one outlet formed in the mounting pad, wherein one or more electronics flow ports enable fluid connection between the flow path within the generator housing and the electronic module when connected and one or more inductor ports enable fluid connection between the flow path within the generator housing and one or more inductors when mounted to the generator housing.

In addition to one or more of the features described above, or as an alternative, further embodiments of the aircraft may include that the mounting pad is configured to mount to an engine of the aircraft.

In addition to one or more of the features described above, or as an alternative, further embodiments of the aircraft may include an electronics module connected to the base of the generator housing and fluidly connected to the flow path within the generator housing, wherein a first electronics flow port directs the working fluid from the inlet of the generator housing into the electronics module and a second electronics flow port directs the working fluid from the electronics module into the generator housing.

In addition to one or more of the features described above, or as an alternative, further embodiments of the aircraft may include a pump installed within the generator housing, wherein the pump pumps a working fluid through at least a portion of the flow path within the generator housing.

In addition to one or more of the features described above, or as an alternative, further embodiments of the aircraft may include that the generator includes a shaft and the flow path is fluidly connected to the shaft to direct the working fluid through the shaft, wherein the shaft is arranged to direct the working fluid into the generator cavity.

In addition to one or more of the features described above, or as an alternative, further embodiments of the aircraft may include that the generator includes at least one stator and at least one rotor.

In addition to one or more of the features described above, or as an alternative, further embodiments of the aircraft may include that the working fluid is engine oil of the engine.

In addition to one or more of the features described above, or as an alternative, further embodiments of the aircraft may include that the flow path directs the working fluid to cascade over the generator within the generator cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 2H is a top-down view illustration of the generator housing of FIG. 1A; and FIGS. 3A-3L illustrate a flow path of a working fluid through a generator assembly in accordance with an embodiment of the present disclosure.

DETAILED DESCRIPTION

A detailed description of one or more embodiments of the disclosed apparatus and method are presented herein by way of exemplification and not limitation with reference to the Figures.

Figure 1A:
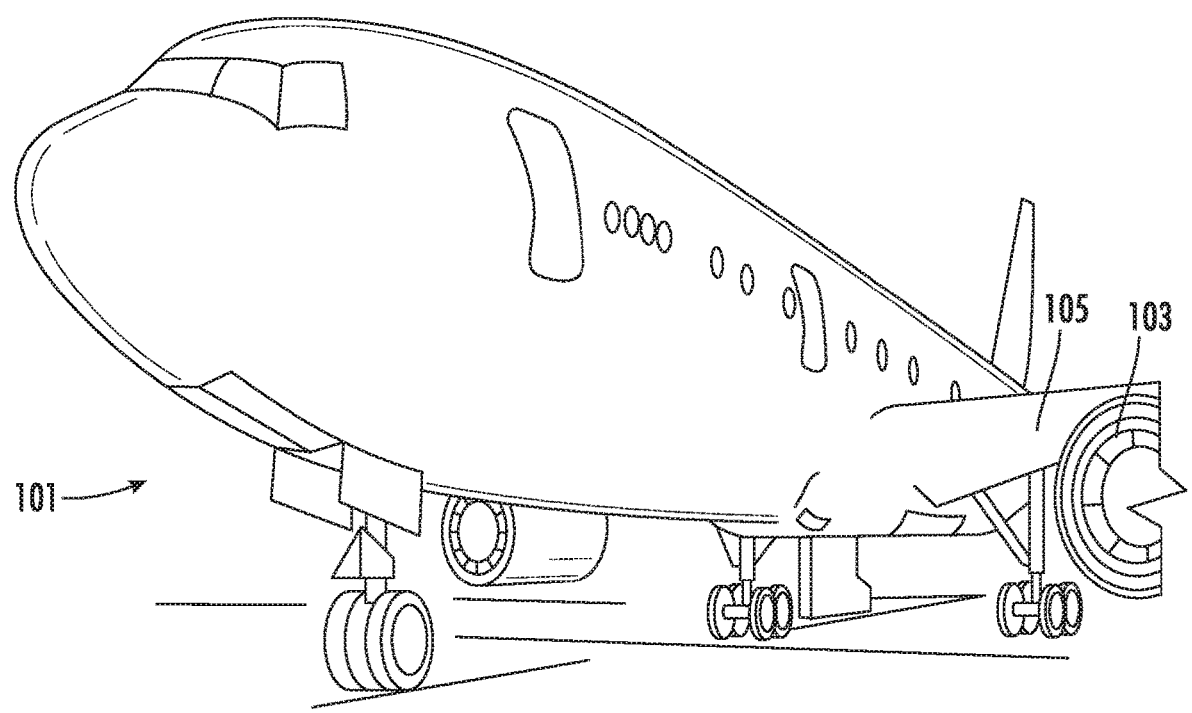
FIG. 1A is a schematic illustration of an aircraft that can incorporate various embodiments of the present disclosure.

As shown in FIG. 1A, an aircraft 101 typically includes one or more engines 103 for driving flight and powering the aircraft. The engines 103 are typically mounted on wings 105 of the aircraft 101, but may be located at other locations depending on the specific aircraft configuration. In some aircraft, the engine(s) may be tail mounted, or housed within the body of the aircraft, or otherwise arranged as will be appreciated by those of skill in the art.

Each engine 103 of the aircraft 101, regardless of location, may include one or more attached or connected generators, as appreciated by those of skill in the art. The generators may provide electrical power to various components of aircraft, as will be appreciated by those of skill in the art. In some configurations, the generators may be operably connected to an output shaft of the engine which drives a stator/rotor to generate electricity. In other configurations, a shaft from the engine may interface to a gearbox, and generators may be mounted, as an accessory, to the gearbox. During operation, various moving parts should be lubricated. Additionally, cooling should be provided to ensure optimal and/or efficient operation of the generator. Support power electronics can be configured in connection with the generator to provide various control of electrical operations of the generator, the engine, and/or other aspects of the aircraft. The power electronic components can include, but are not limited to, inductors, printed wiring boards, capacitors, rectifiers, convertor regulators, general control units, etc., as will be appreciated by those of skill in the art.

Figure 1B:
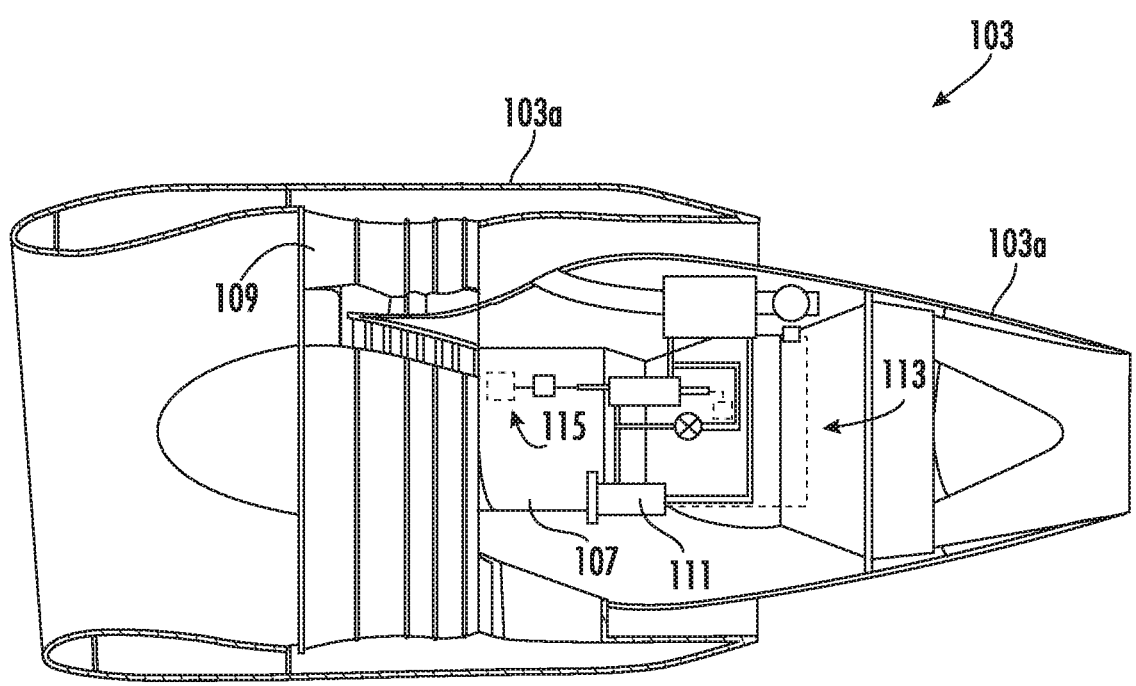
FIG. 1B is a diagrammatic illustration of an engine of the aircraft of FIG. 1A.

Turning to FIG. 1B, a schematic illustration of an engine 103 of the aircraft 101 of FIG. 1A is shown. The engine 103 includes a nacelle 103a that houses an engine 107 and a fan 109. Additional core components may be arranged with the engine 107 and operably connected thereto. For example, an electrical generator 111 may be operably connected to the engine for supplying electric power to the aircraft 101. The electrical generator 111 may be driven, e.g., indirectly (i.e., using a gearbox), by the engine 107. A cooling system 113 can be arranged to supply a working fluid into the electrical generator 111. The cooling system 113 can include an airframe mounted accessory drive that can supply the cooling fluid to the electrical generator 111. Various aircraft electronics 115 can be housed within the nacelle 103a to provide control and other electrical functionality to the engine 103 and/or the aircraft 101. The aircraft electronics 115 can include, but are not limited to, controllers, support power electronics, etc.

It may be advantageous to house the generator and support power electronics in a single housing, or combined housing. Such combined housing may enable the reduction of occupied space by such systems and provide for improved cooling operations.

Turning now to FIGS. 2A-2H, illustratively shown are various schematics of a generator housing 200 in accordance with an embodiment of the present disclosure. The generator housing 200 is arranged to house a generator (e.g., stator-rotor) and receive a drive shaft that is operably connected to an engine of an aircraft. The generator housing 200 is also arranged to connect to or otherwise house power electronics associated with the generator that is housed within the generator housing 200.

Figure 2A:
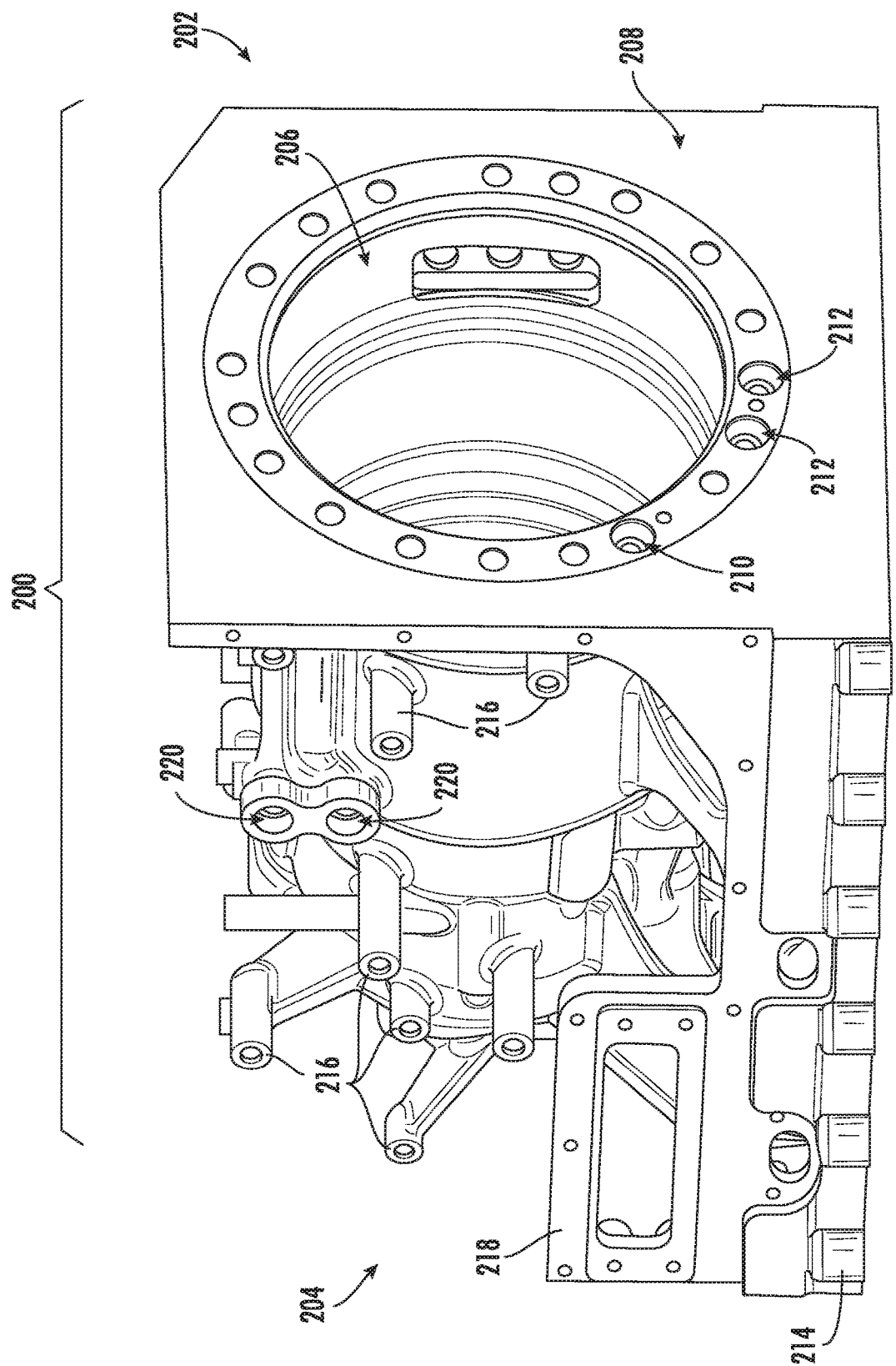
FIG. 2A is a first end isometric illustration of a generator housing in accordance with an embodiment of the present disclosure.
Figure 2B:
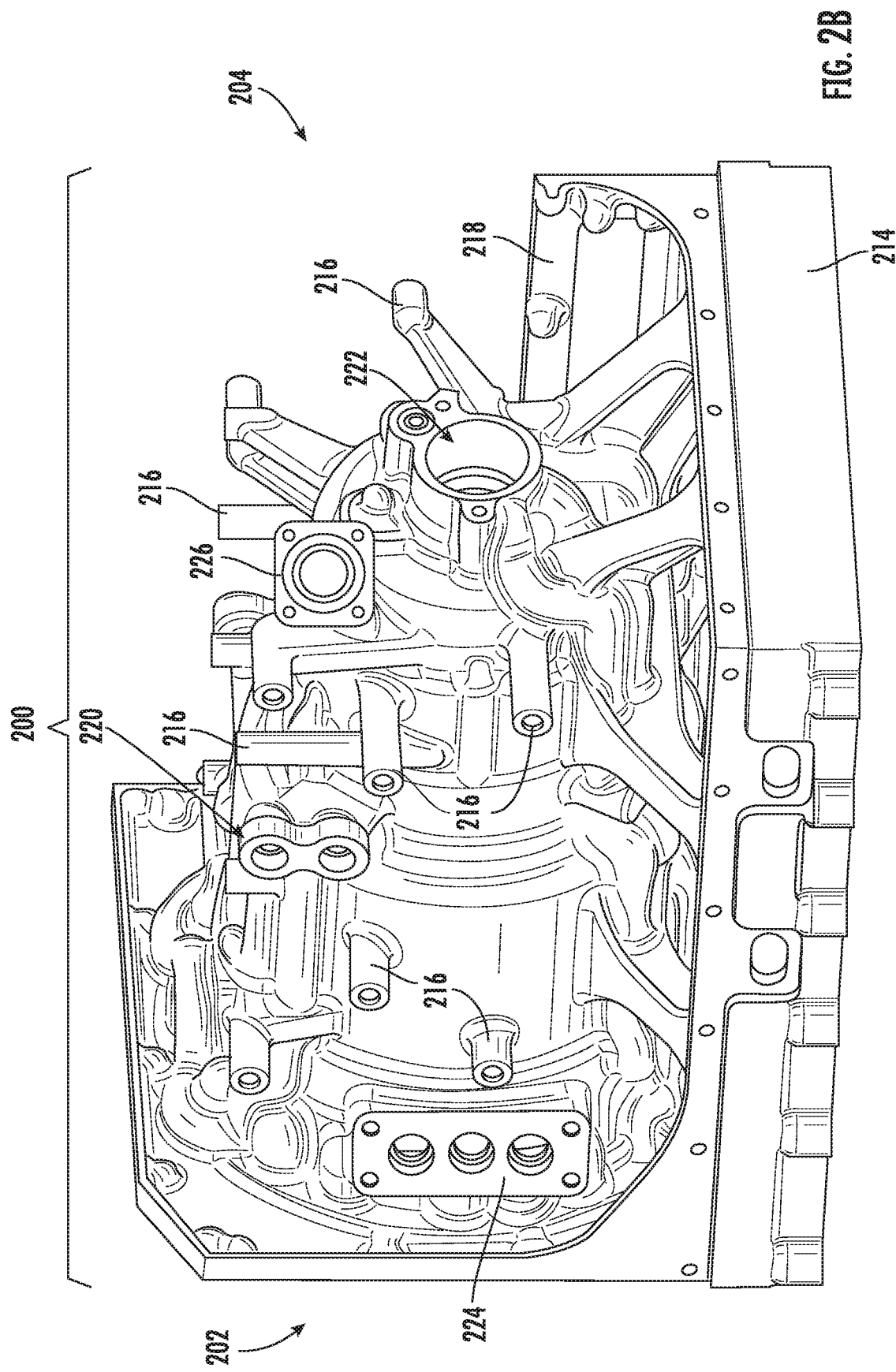
FIG. 2B is a second end isometric illustration of the generator housing of FIG. 1A.
Figure 2C:
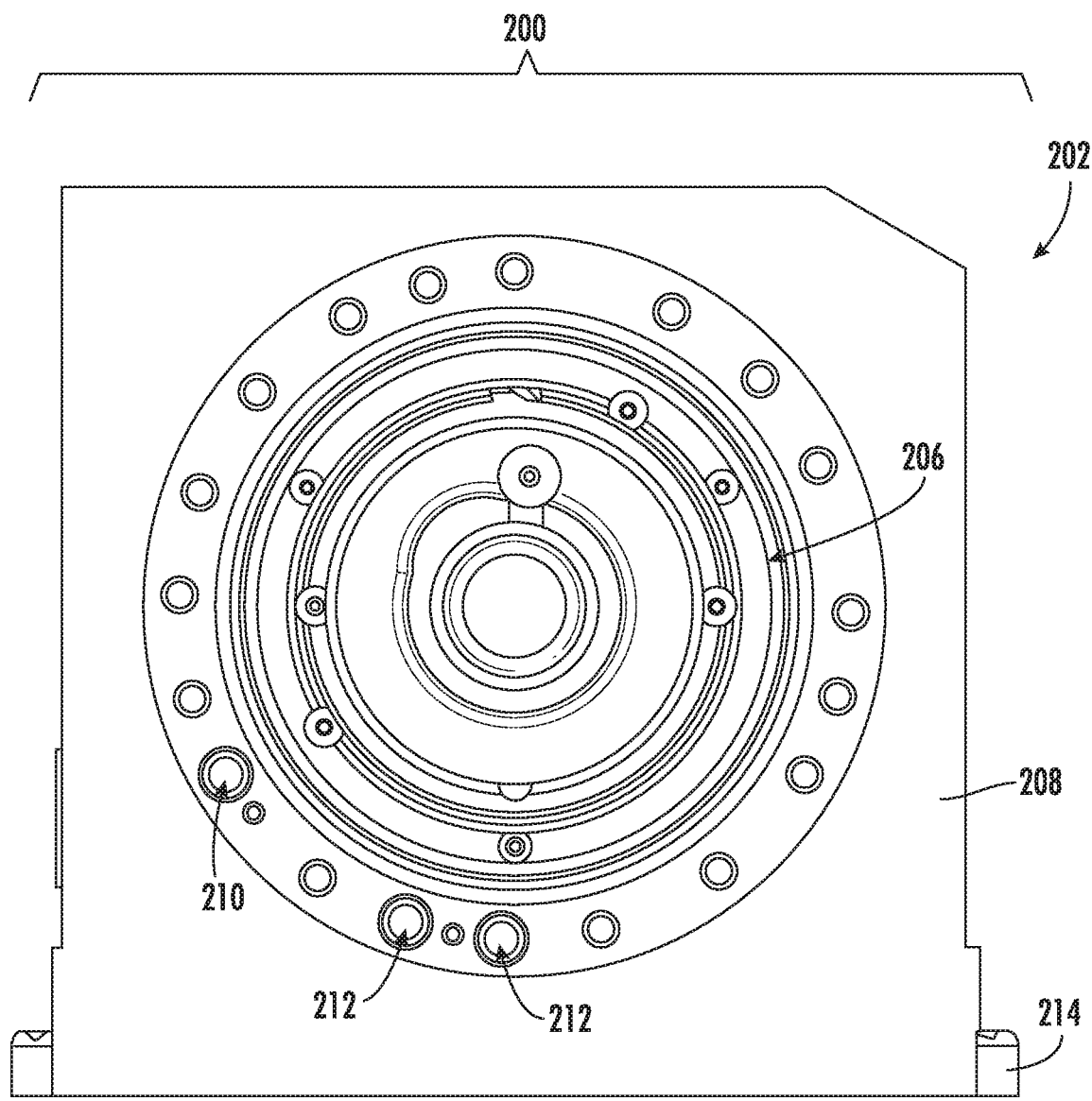
FIG. 2C is an elevation schematic of the first end of the generator housing of FIG. 1A.
Figure 2D:
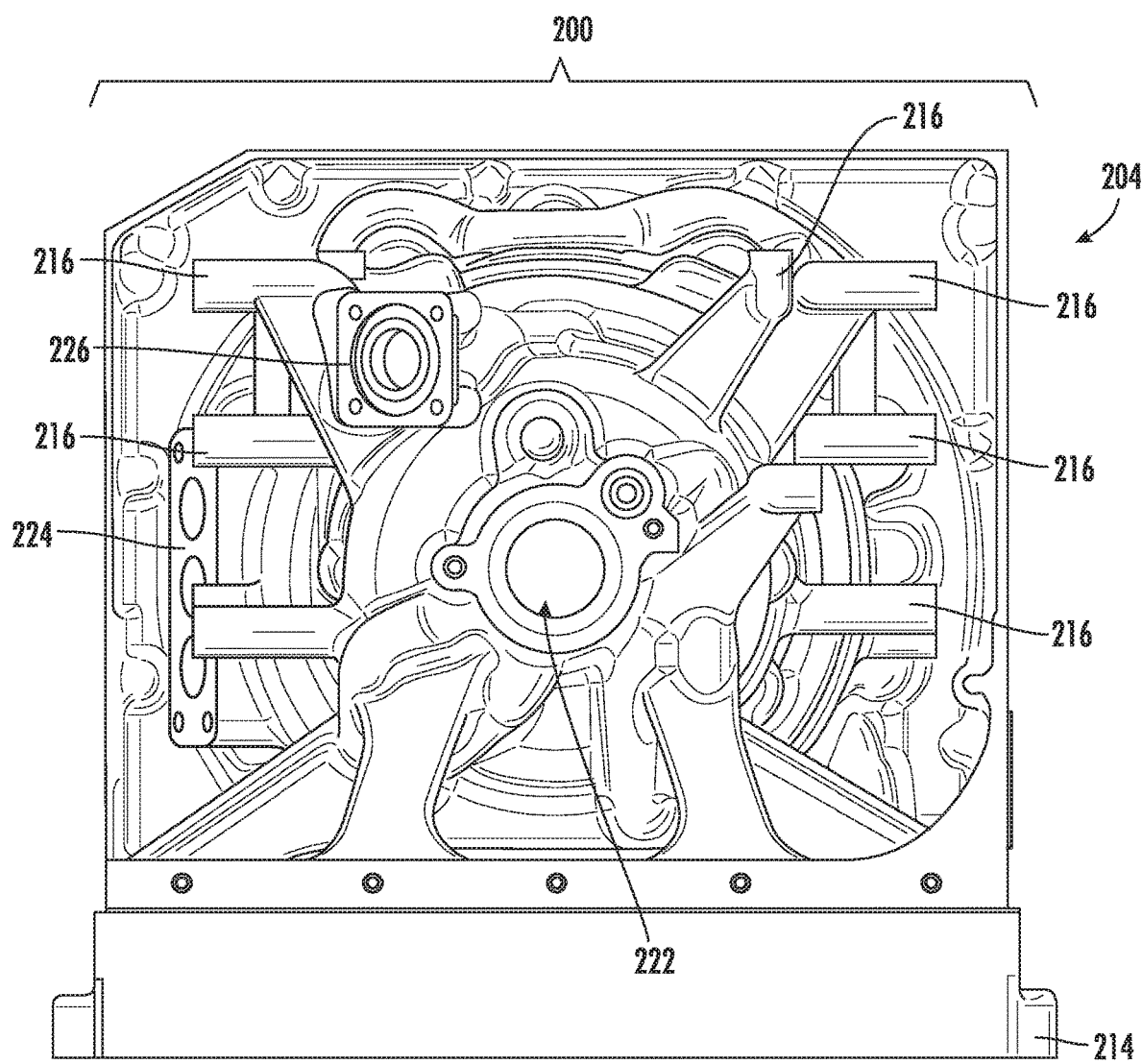
FIG. 2D is an elevation schematic of the second end of the generator housing of FIG. 1A.
Figure 2E:
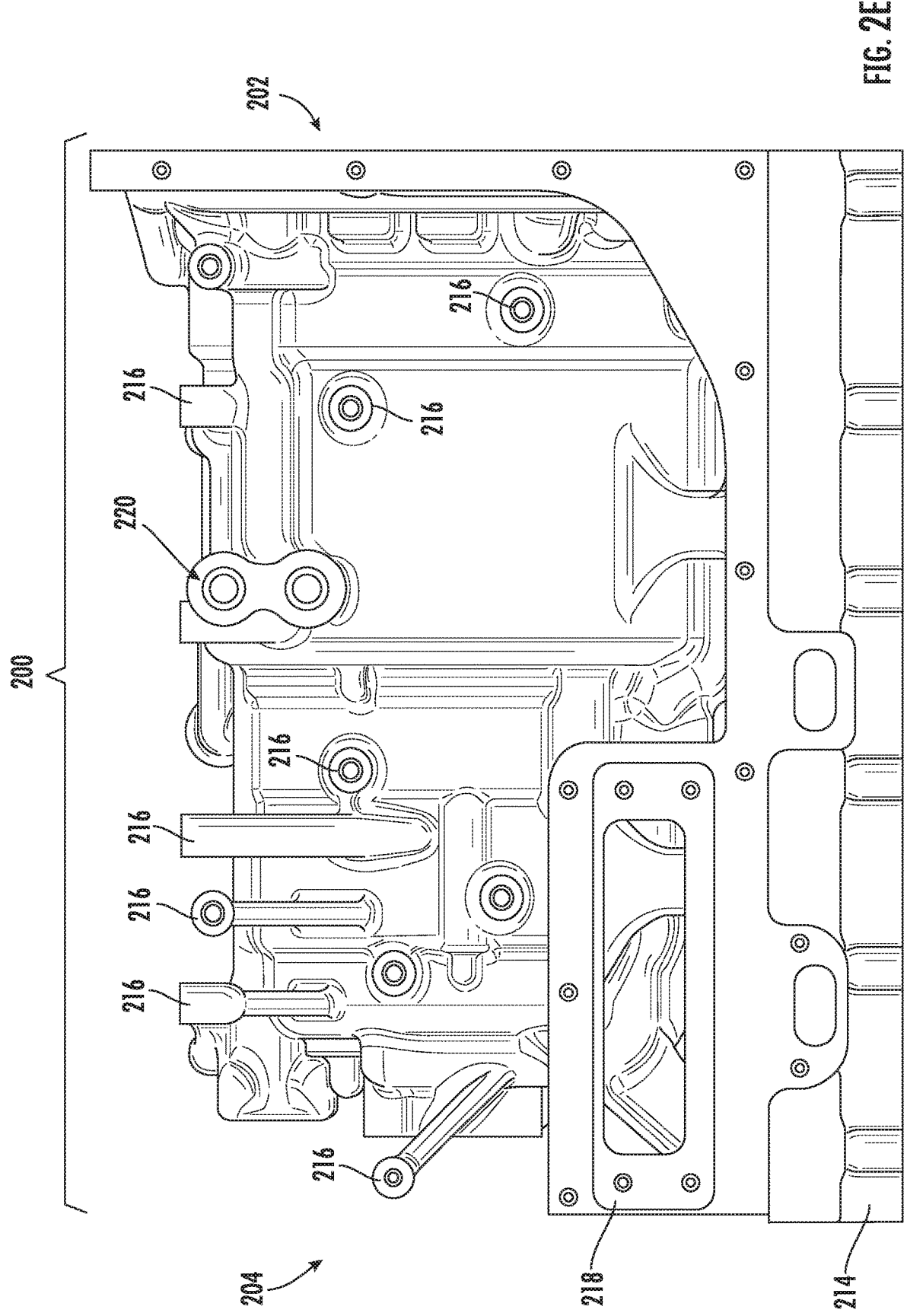
FIG. 2E is a first side elevation schematic of the generator housing of FIG. 1A.
Figure 2F:
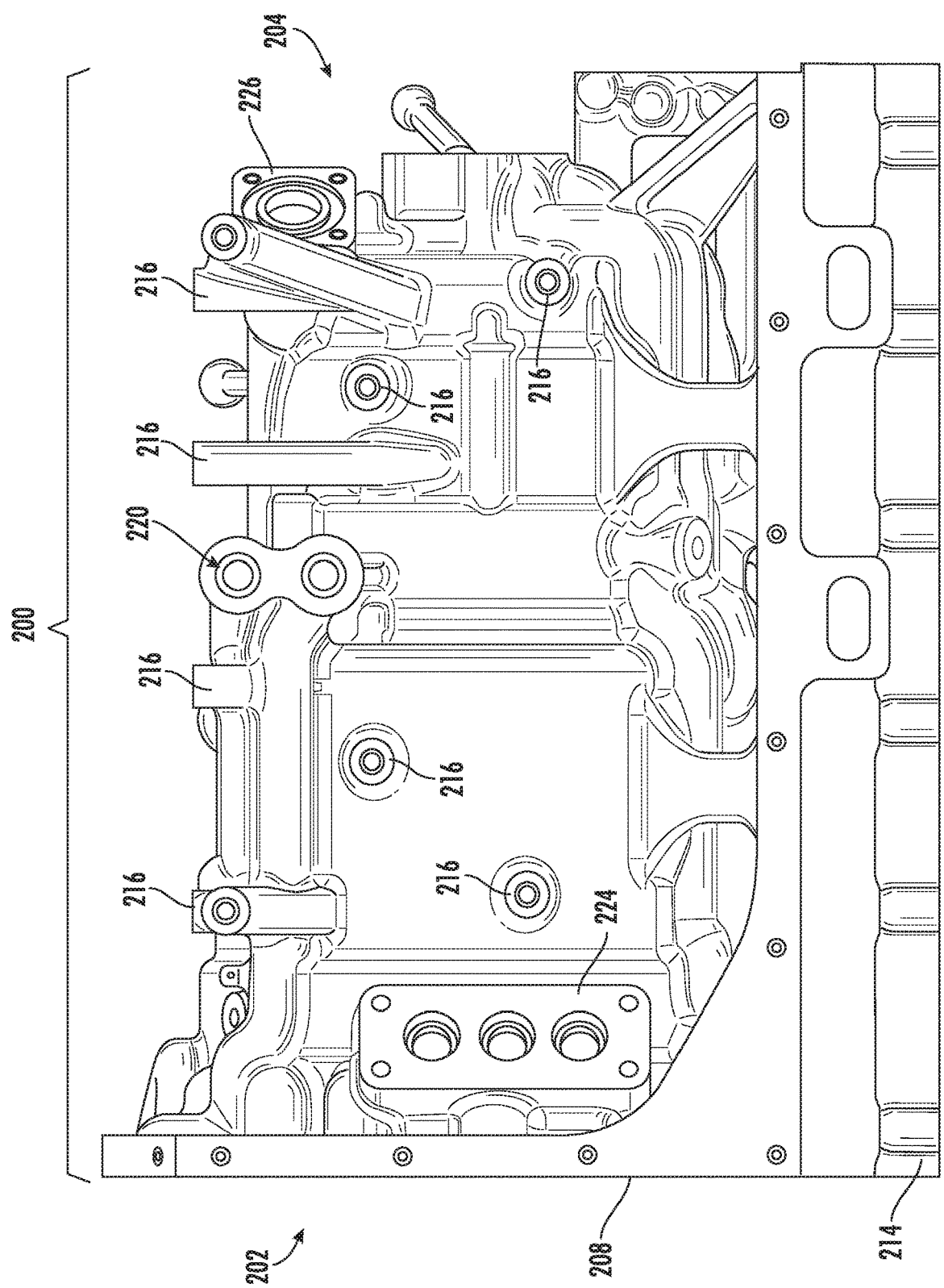
FIG. 2F is a second side elevation schematic of the generator housing of FIG. 1A.
Figure 2G:
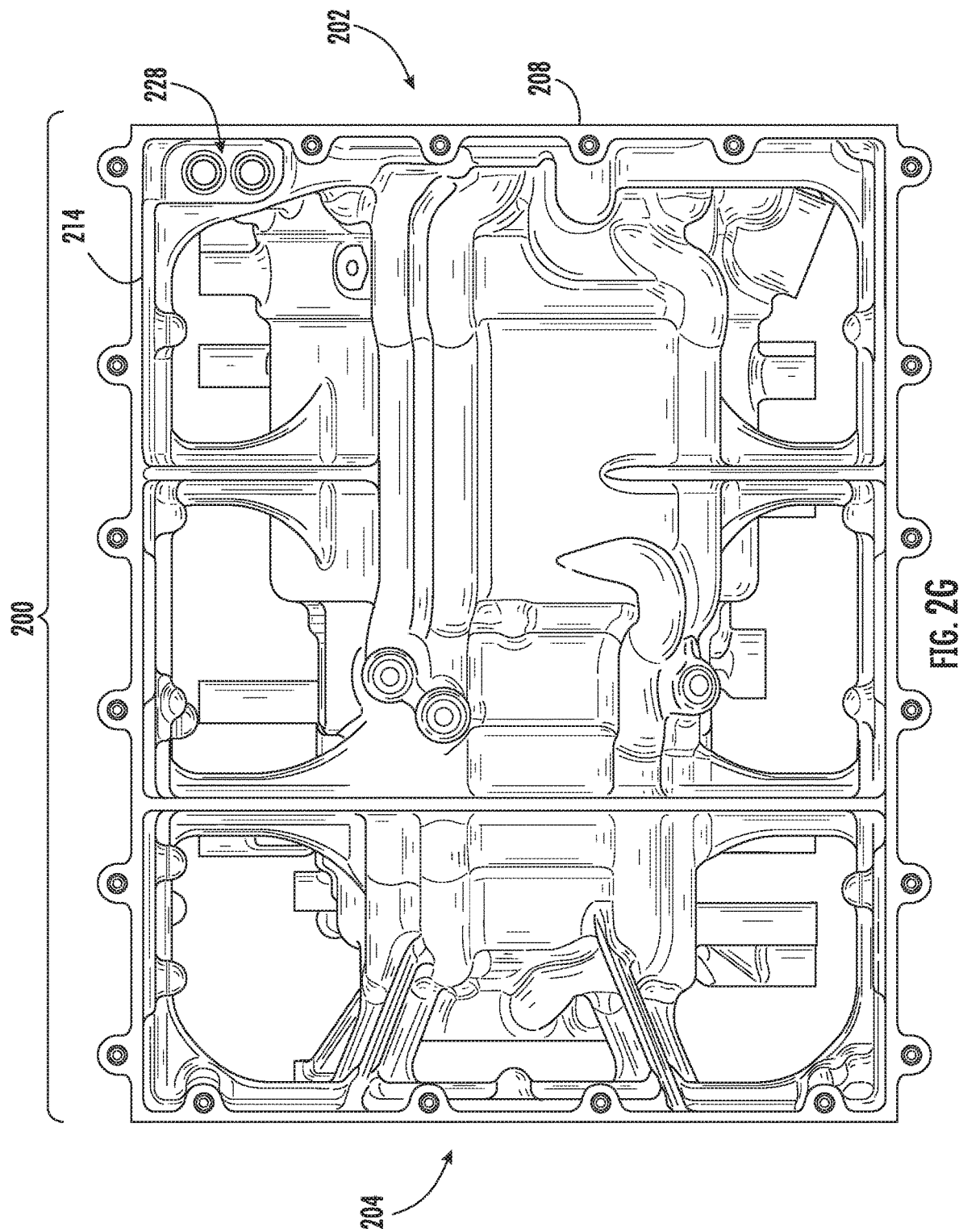
FIG. 2G is a bottom-up view illustration of the generator housing of FIG. 1A.

FIG. 2A is a first end isometric illustration of the generator housing 200. FIG. 2B is a second end isometric illustration of the generator housing 200. FIG. 2C is an elevation schematic of the first end of the generator housing 200. FIG. 2D is an elevation schematic of the second end of the generator housing 200. FIG. 2E is a first side elevation schematic of the generator housing 200. FIG. 2F is a second side elevation schematic of the generator housing 200. FIG. 2G is a bottom-up view illustration of the generator housing 200. FIG. 2H is a top-down view illustration of the generator housing 200.

The generator housing 200 extends from a first end 202 to a second end 204. The generator housing 200 defines a generator cavity 206 for receiving a generator or generator components that may be operably connected to an aircraft engine. The first end 202 is defined in part by a mounting pad 208 which includes an opening to the generator cavity 206. The generator housing 200 is arranged to receive a working fluid, such as oil, and direct passage of the working fluid through the generator housing 200 to provide cooling and/or lubrication to various components of the generator and/or to other electronic components.

The mounting pad 208 includes one or more orifices to allow for the flow of the working fluid into and out of the generator housing 200. The working fluid may be supplied from an airframe mounted accessory drive (AMAD). In some embodiments, the working fluid may be engine oil or air. The working fluid will enter the generator housing 200 at an inlet 210 in the mounting pad 208. The working fluid will exit the generator housing 200 through one or more outlets 212.

The generator housing 200 includes a base 214 that is arranged to receive or attach to an electronics housing (not shown). Further, the generator housing 200 includes various support mounts 216 for supporting components associated with operation of the generator. The support mounts 216 can support inductors, wires, bus bars, connectors, etc., as will be appreciated by those of skill in the art. In this illustrative embodiment, a terminal block mount 218 is provided for mounting a terminal block.

The inlet 210 and outlets 212 define a flow path there between, with the working fluid flowing into the inlet 210, through the flow path of the generator housing 200, and out through the outlets 212. At various locations or points along the flow path, the working fluid may leave the generator housing 200 and enter other components, and then return into the generator housing 200, prior to exiting through the outlets 212. For example, inductor ports 220 may be arranged on the generator housing 200 to enable the working fluid to exit the flow path within the generator housing 200, flow through an inductor, and then return into the flow path of the generator housing 200. Further, as shown in FIG. 2B, the generator housing 200 can include a pump cavity 222 for receiving a pump and is arranged to allow the working fluid to be pressurized or pumped by operation of the pump (e.g., impeller pump) mounted to the generator housing 200 within the pump cavity 222.

Also shown in FIG. 2B, the generator housing 200 includes another terminal block mounting pad 224. The terminal block mounting pad 224 is arranged to receive various electrical components for allowing electrical output from the generator. For example, a three phase electrical power outlet may be mounted to the terminal block mounting pad 224. Further, a connector mounting pad 226 may be arranged to receive control electronics for controlling operation of the generator that are housed within the generator housing 200.

As shown in FIG. 2G, the base 214 may define or include one or more electronics flow ports 228. The electronics flow ports 228 are arranged to enable the working fluid to flow from the generator housing 200 into an electronics module or similar structure, which may include a heat exchanger. The working fluid may flow through the electronics module and then back into the generator housing 200 through one of the electronics flow ports 228. The base 214 may be structurally arranged to receive or attach to the electronics module.

Turning now to FIGS. 3A-3L, schematic illustrations of a generator assembly 330 in accordance with an embodiment of the present disclosure is shown. The generator assembly 330 includes a generator 332 installed within a generator cavity of a generator housing 300 (see FIGS. 3J-3K). The generator housing 300 may be similar to the generator housing 200 shown and described above.

Figure 3A:
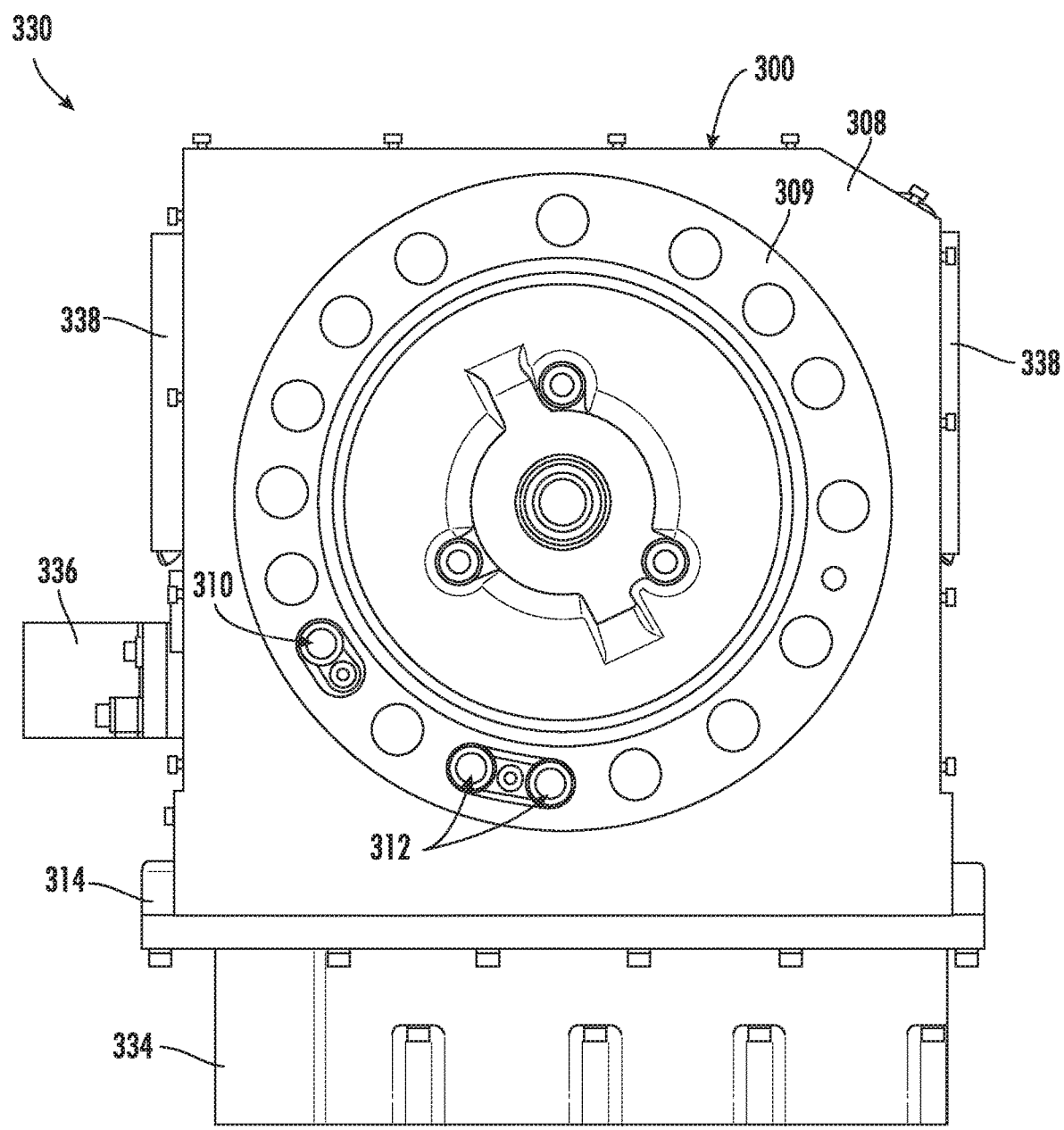

As shown in FIG. 3A, mounted to the generator housing 300 are an electronics module 334, a terminal block 336, and inductors 338. Additionally, as shown in FIG. 3B, mounted to the generator housing 300 are a pump cover 340 (in part housing a pump), connector 342, and a printed circuit board 344. As shown in FIG. 3A, the electronics module 334 is affixed or mounted to a base 314 of the generator housing 300.

The generator assembly 330 can include a rotor portion driven by a drive shaft that is operably connected to a gas turbine engine, and one or more stator portions, housed within the generator cavity of the generator housing 300. A working fluid may enter the generator housing 300 through a pilot housing 309 (of the generator 332) having an inlet 310. The pilot housing 309 is installed into a mounting pad 308. After flowing through the generator housing 300 and any additional components, the working fluid may exit the generator housing through one or more outlets 312.

Figure 3C:
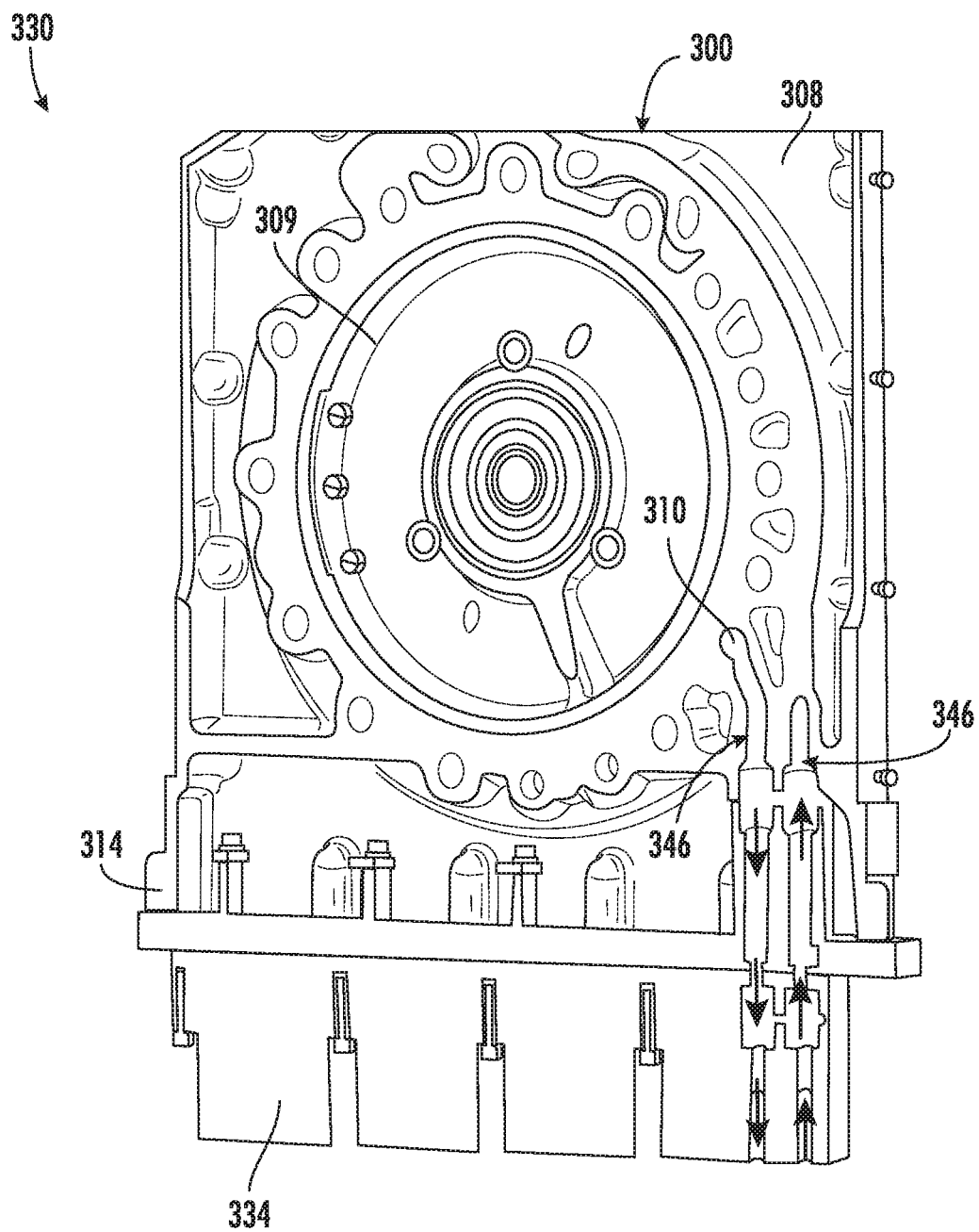

As shown in FIGS. 3B-3C, the working fluid will enter through the inlet 310 and downward toward the electronics module 334, i.e., a first portion of a flow path 346. The working fluid will then provide cooling to the electronics module 334 by flowing there through (e.g., through a heat exchanger) and then the flow path 346 will return into the generator housing 300, as shown by the arrows in FIG. 3C.

Figure 3D:
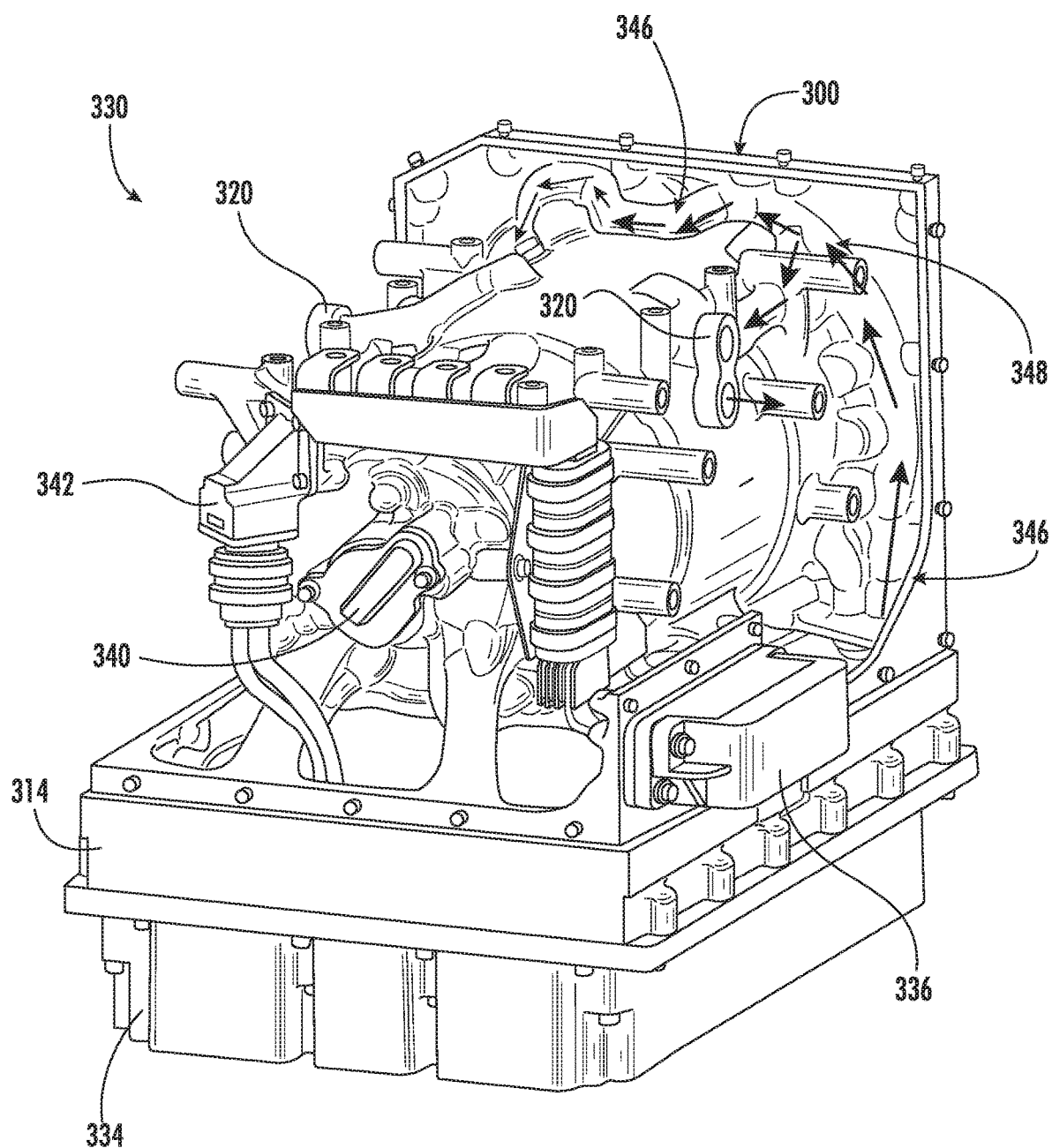
Figure 3E:
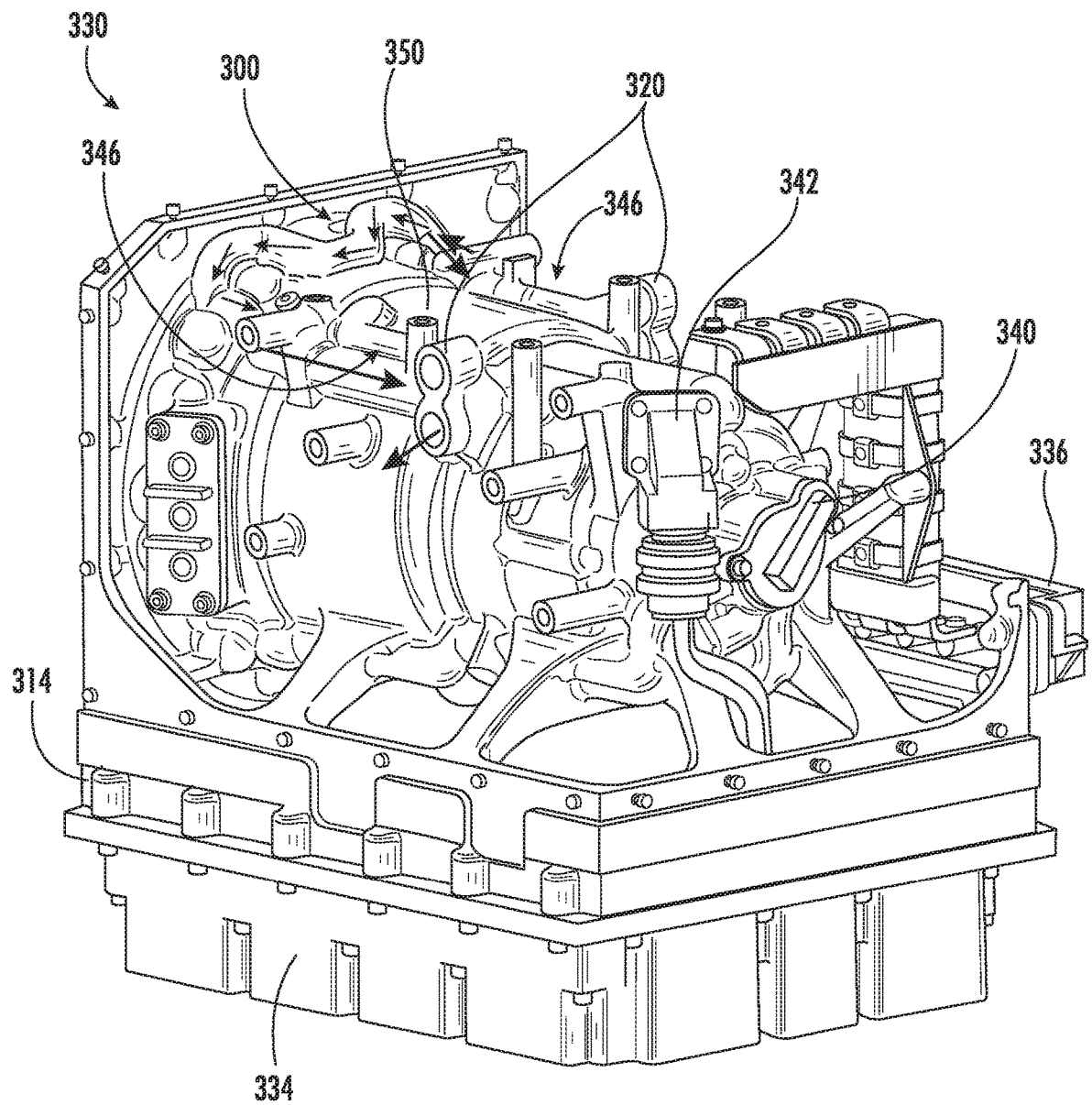

Turning to FIGS. 3D-3E, the flow path 346 flows back into the generator housing 300 from the electronics module 334, as shown by the arrows of flow. The flow path 346 will split at a junction 348 and divide the flow of the working fluid to the inductors 338, through inductor ports 320. In FIGS. 3D-3E, the inductors 338 are not shown for clarify of illustration the flow path 346. The working fluid may then flow through the inductors 338 to provide cooling thereto. The working fluid will then return into the generator housing 300 through an aperture of the inductor ports 320.

Figure 3F:
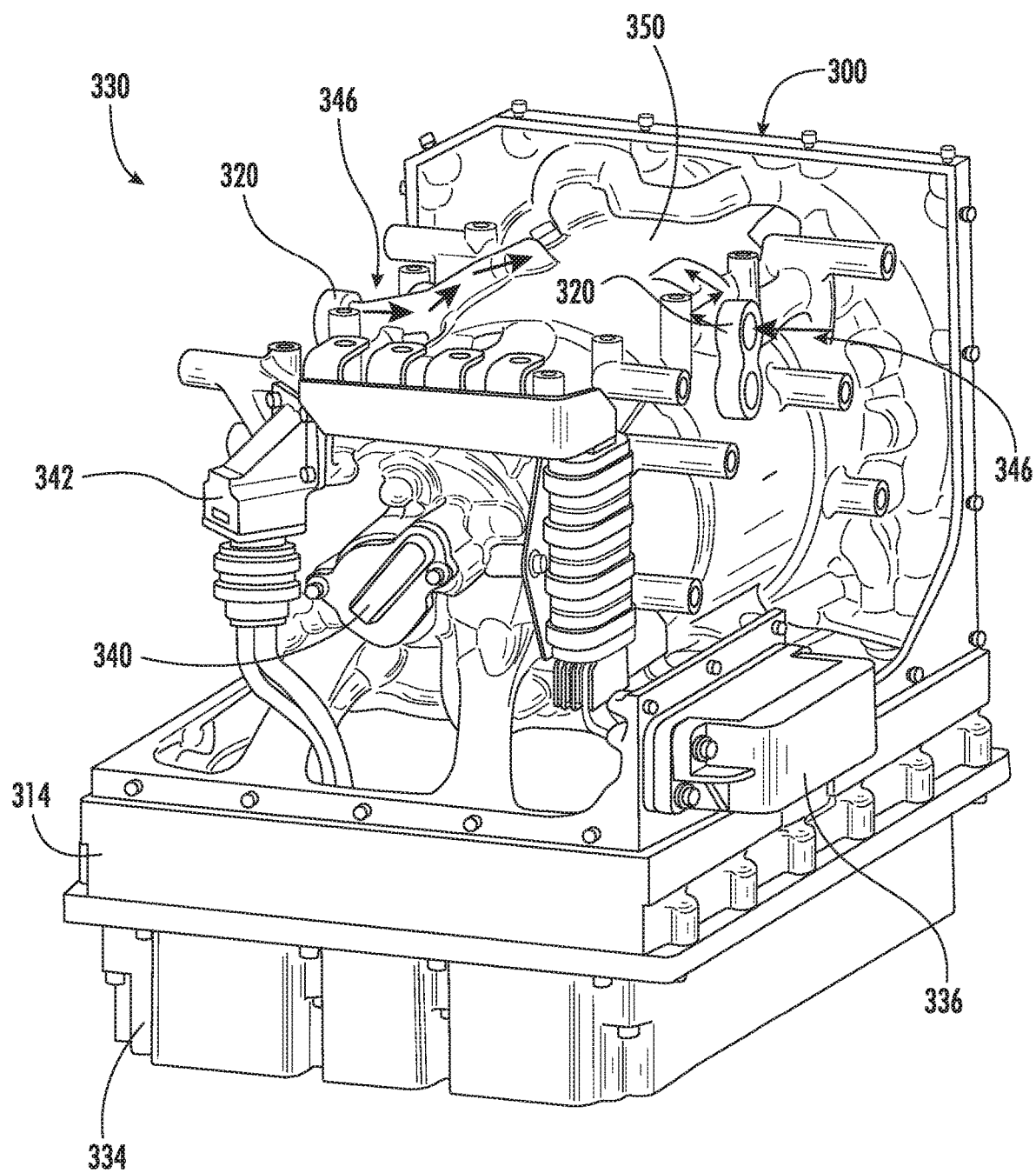
Figure 3G:
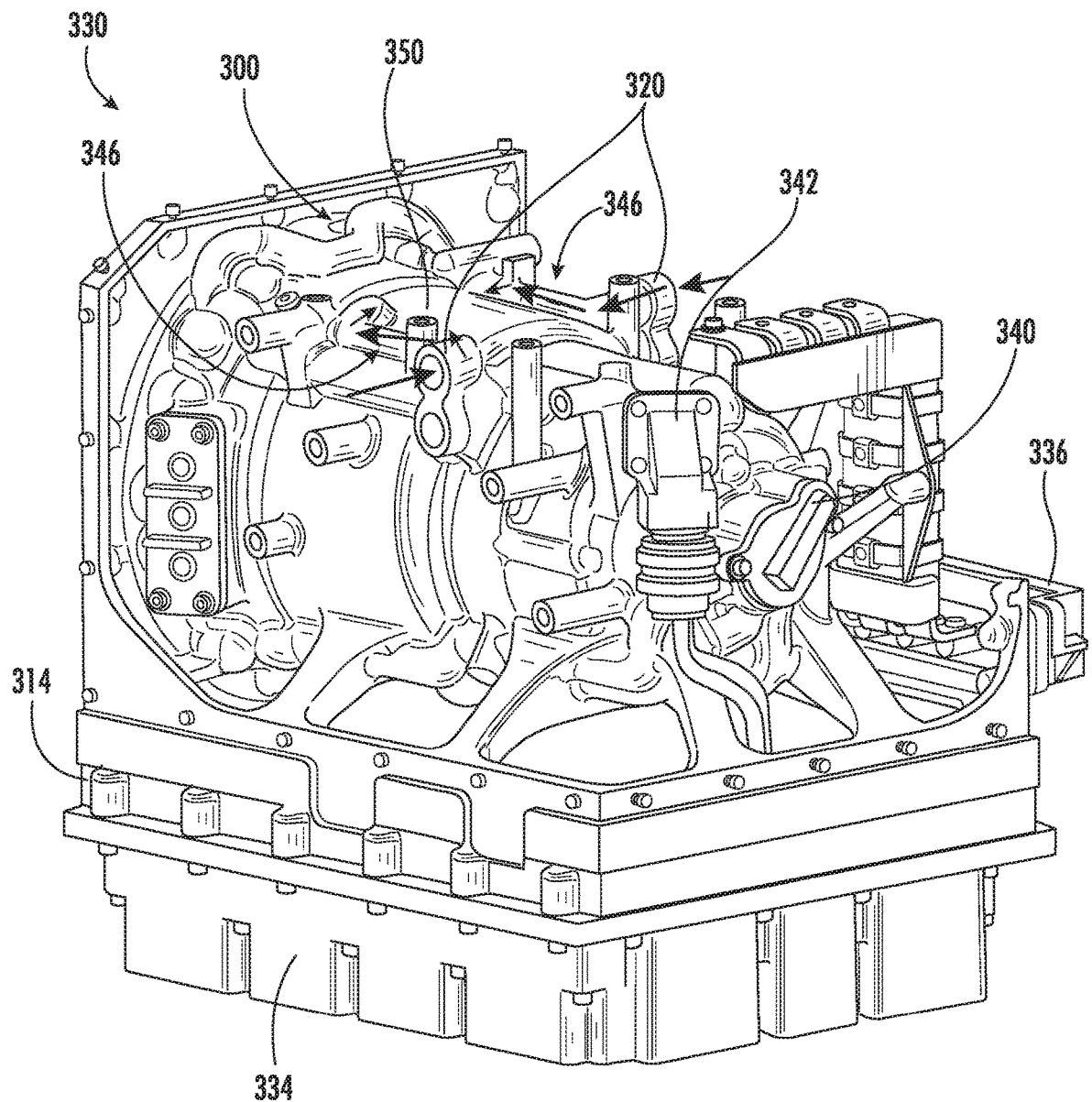

Turning to FIGS. 3F-3G, after cooling the inductors 338, the working fluid will flow back into the flow path 346 of the generator housing 300. The flow path 346 will direct the working fluid into a back iron channel 350 which is arranged relative to the generator 332 within the generator housing 300. For example, the back iron channel 350 may be arranged relative to a main stator of the generator 332.

Figure 3H:
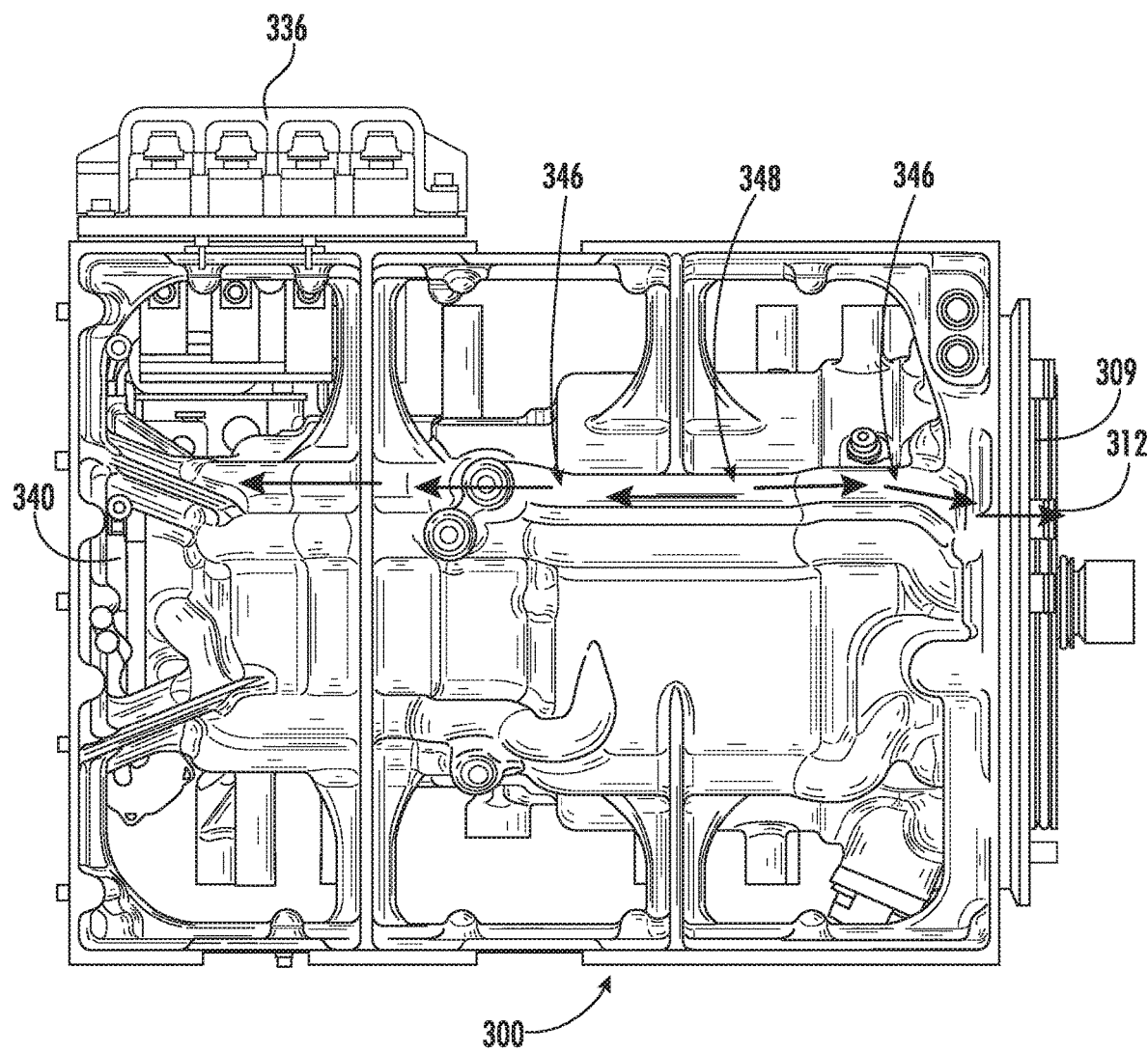
Figure 3I:
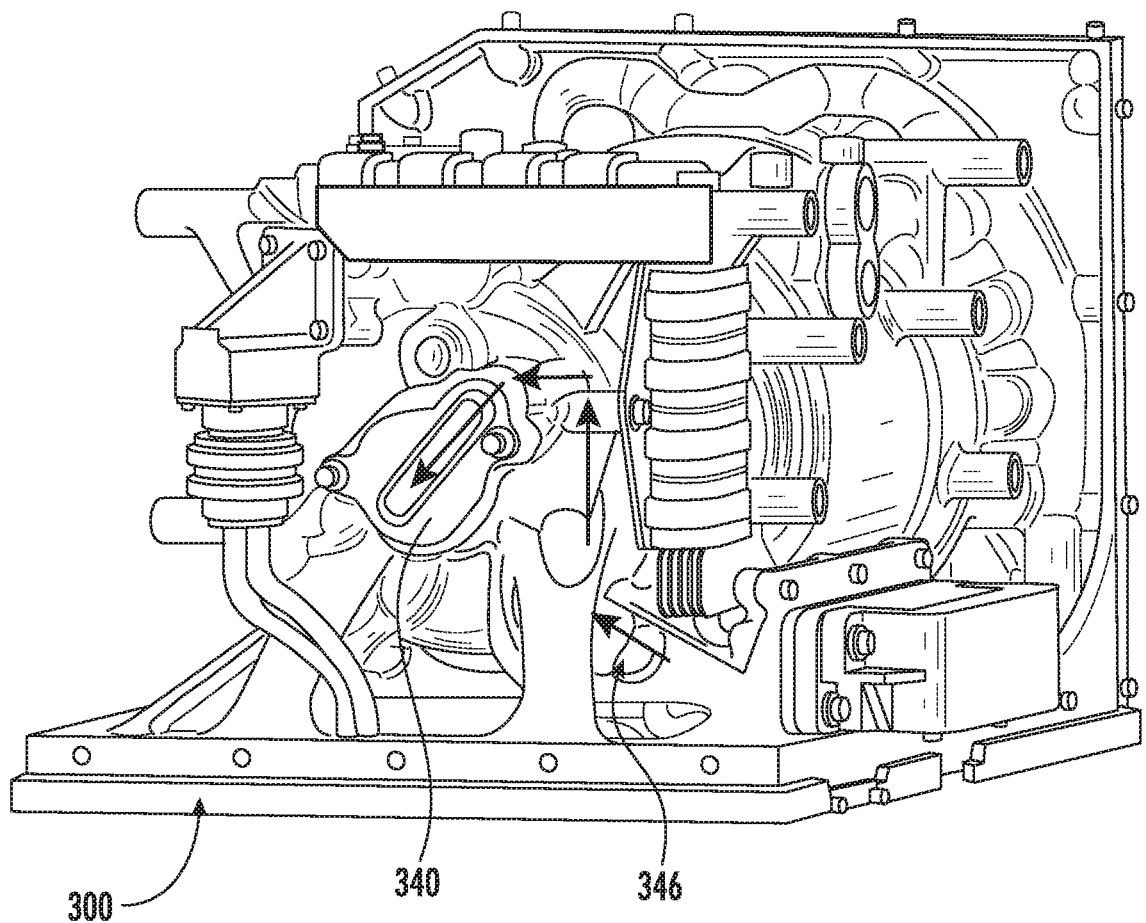

The working fluid will cascade downward through the generator cavity of the generator housing 300, and reenter the flow path 346. As shown in FIG. 3H, a junction 348 will separate the working fluid after flowing through the generator cavity. For example, a portion will flow out of the generator housing 300 through an outlet 312 and another portion of the working fluid will continue to flow through the flow path 346 toward the pump cover 340, as shown in FIG. 3I. Thus, after exiting the back iron channel 350, the flow path 346 will split the working fluid such that a majority of the working fluid will return to the AMAD and a portion will be pumped through the pump cover 340 to be provided to a rotor shaft of the generator 332 and may provide cooling to components of the generator 332.

Figure 3J:
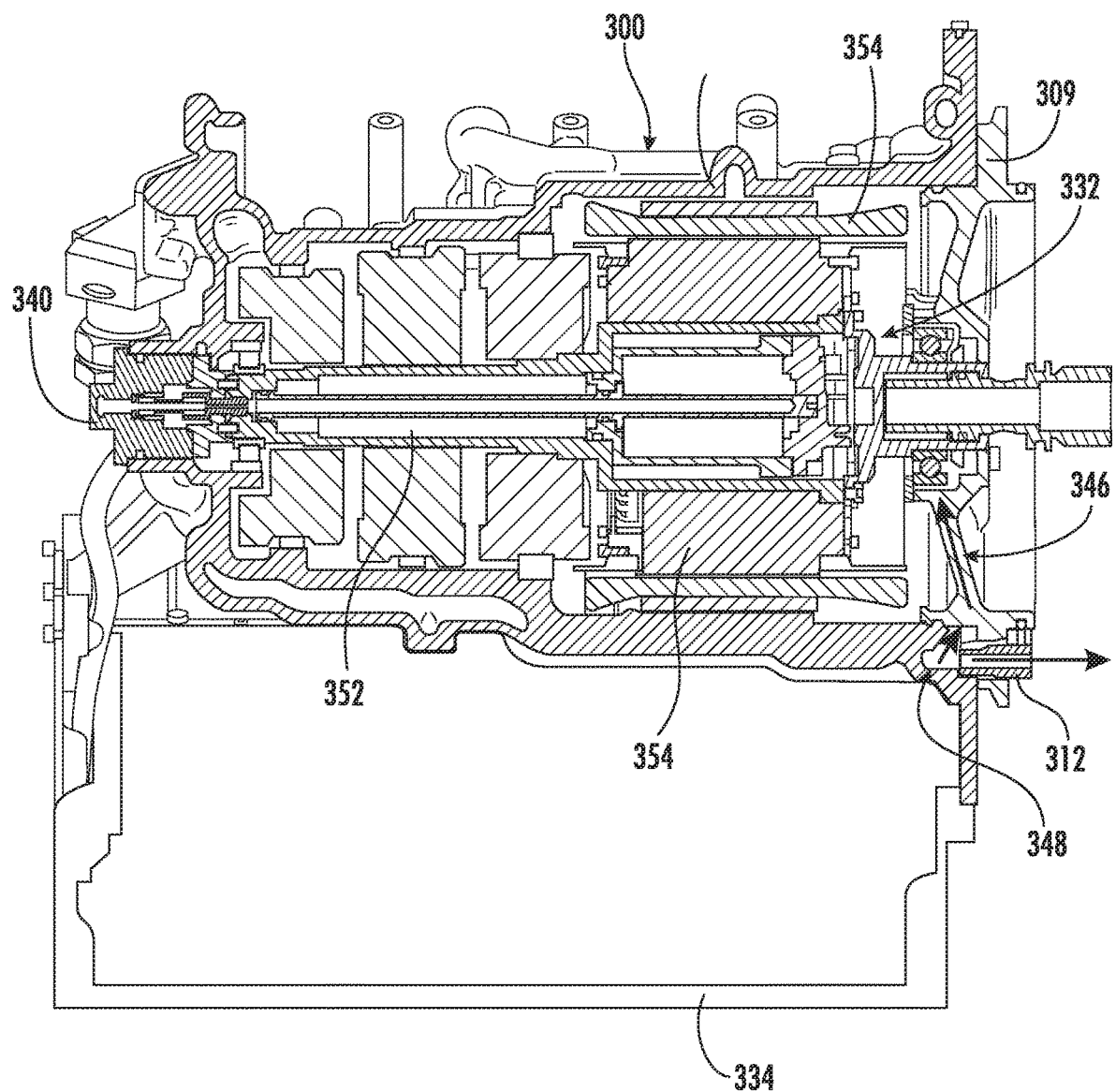

As shown in FIG. 3J, the flow path 346 includes a junction 348 proximate the outlet 312. The junction 348 proximate the outlet 312 enables a portion of the working fluid to feed a bearing film of the generator 332.

Figure 3K:
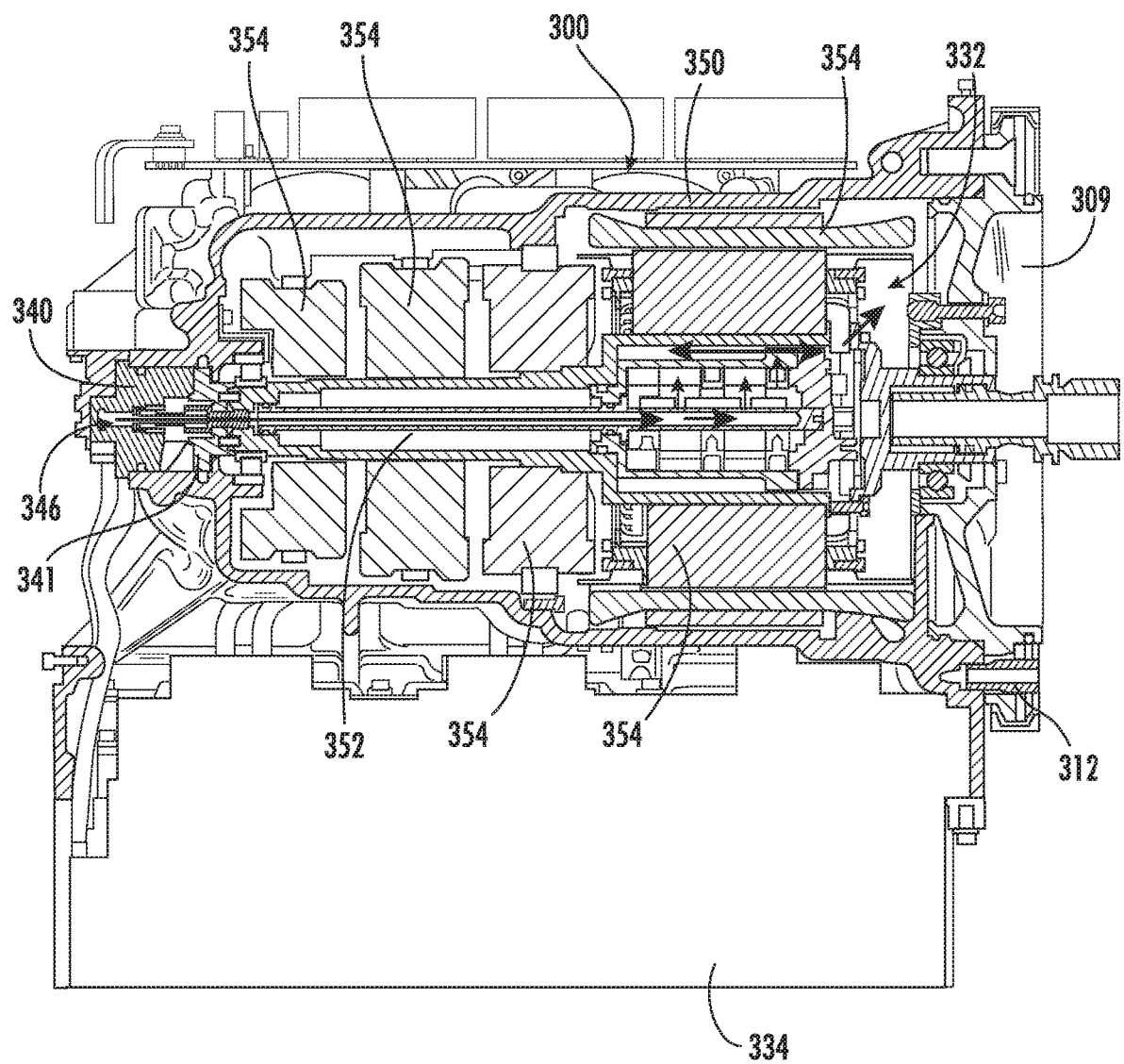

FIG. 3K illustrates the flow path 346 of the portion that does not flow toward the outlet 312 after flowing through the back iron channel 350. The working fluid enters through the pump cover 340 and moves along a shaft 352 of the generator 332 to provide cooling and/or lubrication to one or more generator components 354 (e.g., stators, rotors, exciters, and other generator components). In some embodiments, the working fluid may be direct sprayed into the generator cavity as a mist.

Figure 3L:
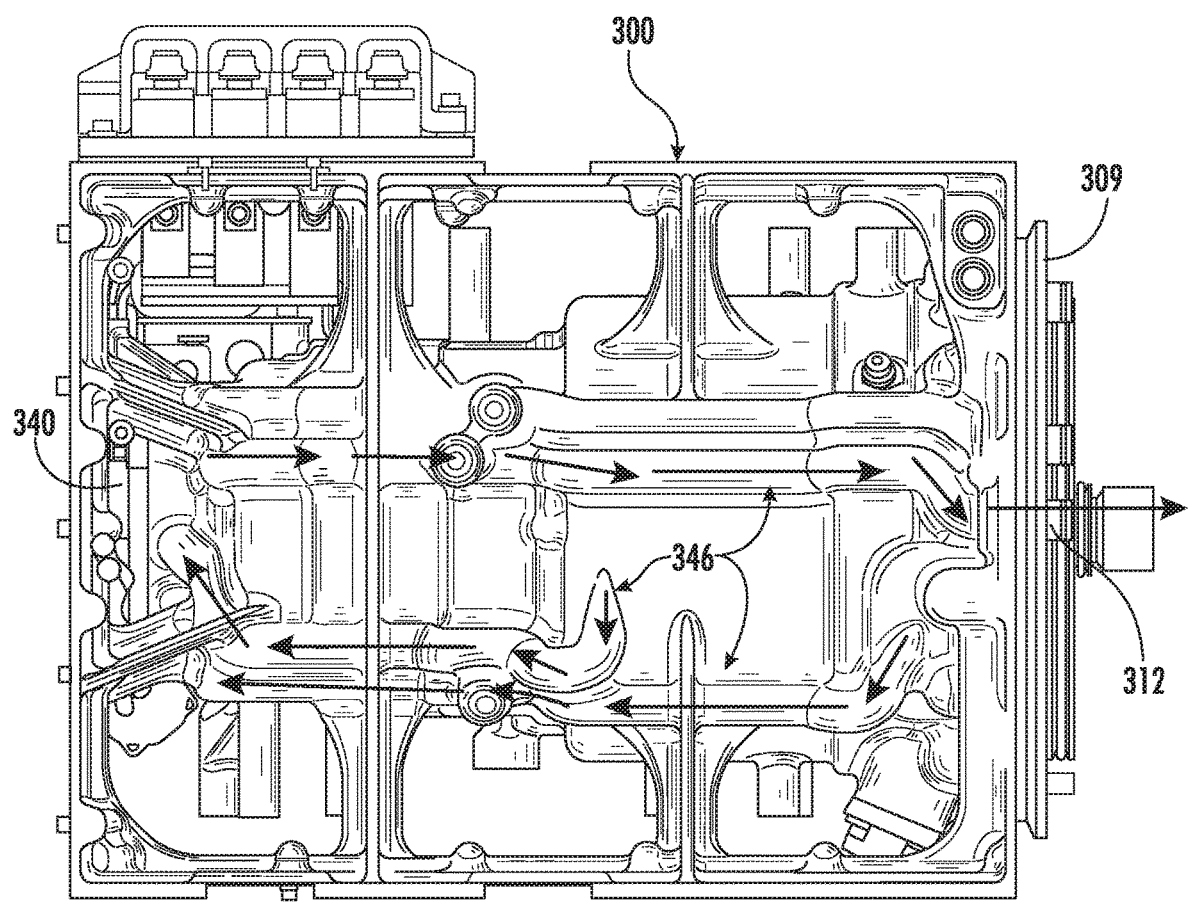

As shown in FIG. 3L, the working fluid that is within the generator cavity may be picked up by the pump 341 at one or more locations and sent back to the AMAD through an outlet 312.

Advantageously, embodiments provided herein enable efficient and controlled cooling and lubrication of an aircraft generator while also provided cooling to electronics and other components associated with the aircraft generator. The generator housings described herein provide structural support for a generator and electrical components while at the same time providing cooling via a working fluid flow path. Additional cooling may be provided through conduction cooling using coring and/or posts, as illustratively shown herein. Additionally, the flow path may provide for spray cooling of generator cooling.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A generator housing for a generator of an aircraft, the generator housing comprising:
   a mounting pad at a first end, the generator housing extending to a second end; and
   a base arranged to connect to an electronics module;
   wherein the generator housing defines a generator cavity and a flow path to supply a working fluid through the generator housing, the flow path extending between an inlet formed in the mounting pad and at least one outlet formed in the mounting pad,
   wherein one or more electronics flow ports enable fluid connection between the flow path within the generator housing and the electronic module when connected and one or more inductor ports enable fluid connection between the flow path within the generator housing and one or more inductors when mounted to the generator housing.

2. The generator housing for a generator of an aircraft of claim 1, wherein the mounting pad is configured to mount to an engine of the aircraft.

3. A generator assembly of an aircraft comprising:
   a generator housing defining a generator cavity; and
   a generator installed within the generator cavity,
   wherein the generator housing includes a mounting pad at a first end, the generator housing extending to a second end, and a base arranged to connect to an electronics module, wherein the generator housing defines a generator cavity and a flow path to supply a working fluid through the generator housing, the flow path extending between an inlet formed in the mounting pad and at least one outlet formed in the mounting pad, wherein one or more electronics flow ports enable fluid connection between the flow path within the generator housing and the electronic module when connected and one or more inductor ports enable fluid connection between the flow path within the generator housing and one or more inductors when mounted to the generator housing.

4. The generator assembly of claim 3, wherein the mounting pad is configured to mount to an engine of the aircraft.

5. The generator assembly of claim 3, further comprising an electronics module connected to the base of the generator housing and fluidly connected to the flow path within the generator housing.

6. The generator assembly of claim 5, wherein a first electronics flow port directs the working fluid from the inlet of the generator housing into the electronics module and a second electronics flow port directs the working fluid from the electronics module into the generator housing.

7. The generator assembly of claim 3, further comprising a pump installed within the generator housing, wherein the pump pumps a working fluid through at least a portion of the flow path within the generator housing.

8. The generator assembly of claim 3, wherein the generator includes a shaft and the flow path is fluidly connected to the shaft to direct the working fluid through the shaft.

9. The generator assembly of claim 8, wherein the shaft is arranged to direct the working fluid into the generator cavity.

10. The generator assembly claim 3, wherein the generator includes at least one stator and at least one rotor.

11. The generator assembly of claim 3, wherein the working fluid is engine oil of a gas turbine engine.

12. The generator assembly of claim 3, wherein the flow path directs the working fluid to cascade over the generator within the generator cavity.

13. An aircraft comprising:
an engine; and
a generator assembly mounted to the engine, wherein the generator assembly comprises:
a generator housing defining a generator cavity; and
a generator installed within the generator cavity, wherein the generator is operably connected to the engine,
wherein the generator housing includes a mounting pad at a first end for mounting to the engine, the generator housing extending to a second end, and a base arranged to connect to an electronics module, wherein the generator housing defines a generator cavity and a flow path to supply a working fluid through the generator housing, the flow path extending between an inlet formed in the mounting pad and at least one outlet formed in the mounting pad, wherein one or more electronics flow ports enable fluid connection between the flow path within the generator housing and the electronic module when connected and one or more inductor ports enable fluid connection between the flow path within the generator housing and one or more inductors when mounted to the generator housing.

14. The aircraft of claim 13, wherein the mounting pad is configured to mount to an engine of the aircraft.

15. The aircraft of claim 13, further comprising an electronics module connected to the base of the generator housing and fluidly connected to the flow path within the generator housing, wherein a first electronics flow port directs the working fluid from the inlet of the generator housing into the electronics module and a second electronics flow port directs the working fluid from the electronics module into the generator housing.

16. The aircraft of claim 13, further comprising a pump installed within the generator housing, wherein the pump pumps a working fluid through at least a portion of the flow path within the generator housing.

17. The aircraft of claim 13, wherein the generator includes a shaft and the flow path is fluidly connected to the shaft to direct the working fluid through the shaft, wherein the shaft is arranged to direct the working fluid into the generator cavity.

18. The aircraft claim 13, wherein the generator includes at least one stator and at least one rotor.

19. The aircraft of claim 13, wherein the working fluid is engine oil of the engine.

20. The aircraft of claim 13, wherein the flow path directs the working fluid to cascade over the generator within the generator cavity.

* * * * *